(No Model.)
S. M. MOORE.
ANIMAL POKE.
No. 320,492. Patented June 23, 1885.
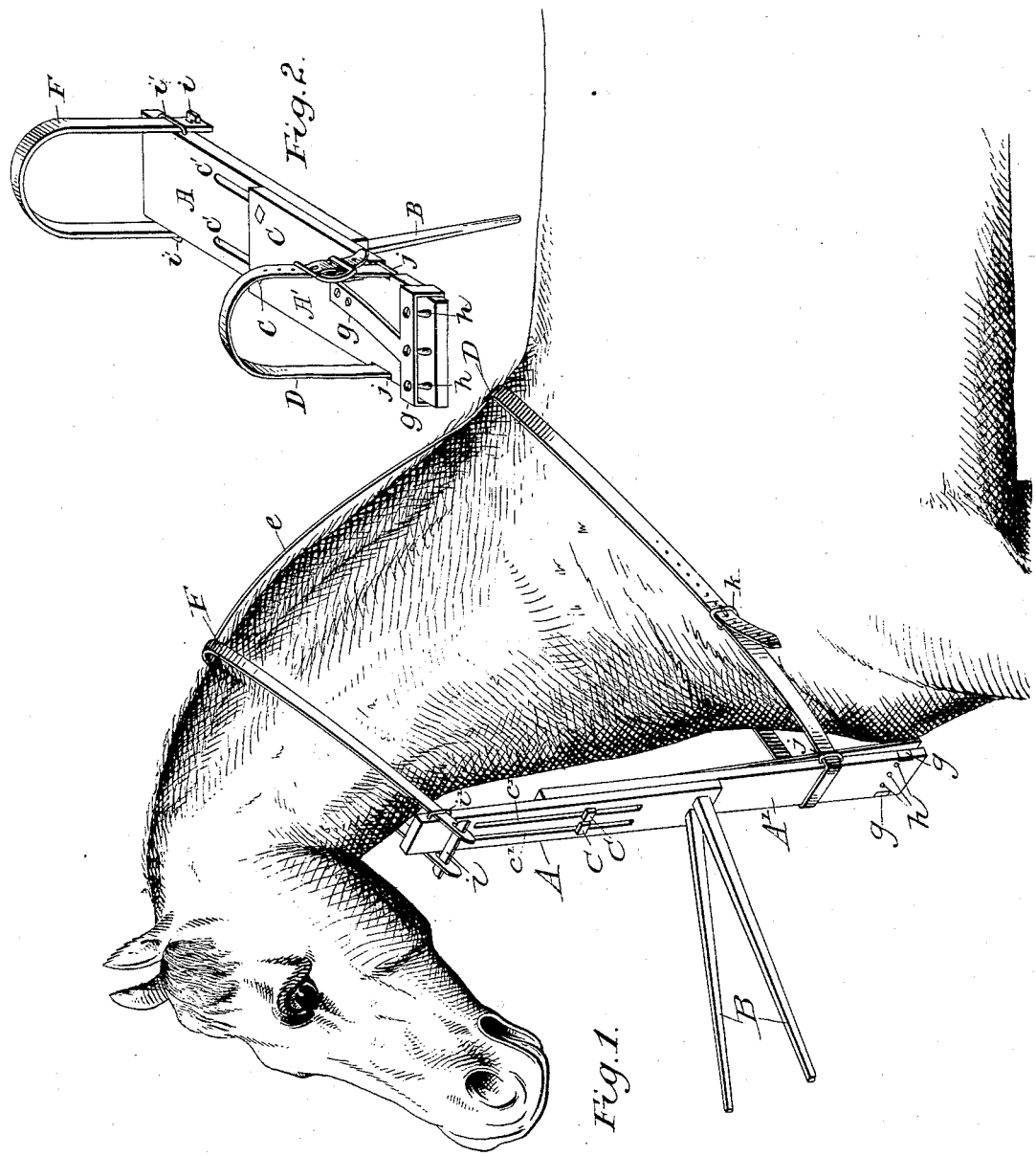

UNITED STATES PATENT OFFICE.

SAMUEL M. MOORE, OF LUKIN, ILLINOIS.

ANIMAL-POKE.

SPECIFICATION forming part of Letters Patent No. 320,492, dated June 23, 1885.

Application filed February 25, 1884. (No model.)

*To all whom it may concern:*

Be it known that I, SAMUEL M. MOORE, a citizen of the United States and a resident of the town of Lukin, in the county of Lawrence and State of Illinois, have invented certain new and useful Improvements in Animal-Pokes, of which the following is a full, clear, and exact description, reference being had to the accompanying drawings, which form a part of this specification, and in which—

Figure 1 is a perspective view of my improved animal-poke, showing the same applied to a horse and in position for operation; and Fig. 2 is a view of the back of the device removed from the horse, the adjusting-strip $e$ being omitted.

In the drawings, A represents the upper member of the poke, which is provided with parallel slots C'; A', the lower member, which is provided with bolts C, to be inserted in the slots C' for adjustably connecting the upper and lower members to suit the size of the animal on which the poke is used. The upper member, A, is provided with diverging arms or fenders B, and the lower member, A', with pricks or prods $h$ and with a spring-plate, $g$, having holes therein coincident with the prods in the lower member. The spring is intended to prevent the prods from pricking the breast of the animal when the poke is in its normal position.

The poke is held in position on the animal by means of a bow, F, which is placed about the animal's neck, its ends passed through staples $i'$ in the upper edges of the upper member and secured in place by the key $i$. A strap, D, is passed through staples $j$ in the lower edges of the lower member and around the animal's neck, and its ends fastened together by the usual buckle, $k$. A strip of wood, $l$, connects the bow F to the strap D and assists the adjustment.

From the above description, taken in connection with the drawings, the advantages and operation of the invention will be readily understood. The advantages are that it can be readily adjusted to suit any sized animal. The operation is simple. If the animal approaches the fence, the arms or fenders B will strike the same or be caught under the rails, forcing the lower part of the poke against the breast of the animal, compressing the spring, and allowing the prods to prick the animal, and cause it to withdraw from the fence, and this prevents its jumping or breaking down the fence.

Having thus described my invention, what I claim, is—

An animal-poke consisting of the upper member, A, and the lower member, A', adjustably connected by the bolts C, the bow F secured to the upper member by the staples $i'$ and key $i$, strap D, held to the lower member by staples $j$, its ends being fastened together by the buckle $k$, the strip $e$ connecting the bow and strap, the spring-plate $g$, and the prods $h$, all substantially as described.

SAMUEL M. MOORE.

Witnesses:
H. C. SUTHERLAND,
D. T. CLARK.